(12) United States Patent
Homma

(10) Patent No.: US 6,175,384 B1
(45) Date of Patent: *Jan. 16, 2001

(54) VIDEO CAMERA APPARATUS HAVING AN EXPOSURE CONTROL DEVICE

(75) Inventor: Hideo Homma, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/572,191

(22) Filed: Dec. 13, 1995

Related U.S. Application Data

(63) Continuation of application No. 08/229,868, filed on Apr. 18, 1994, now abandoned, which is a continuation of application No. 08/097,942, filed on Jul. 26, 1993, now abandoned, which is a continuation of application No. 07/788,196, filed on Nov. 5, 1991, now abandoned, which is a continuation of application No. 07/651,282, filed on Feb. 5, 1991, now Pat. No. 5,065,248, which is a continuation of application No. 07/513,683, filed on Apr. 24, 1990, now abandoned, which is a continuation of application No. 07/312,962, filed on Feb. 21, 1989, now abandoned.

(30) Foreign Application Priority Data

Mar. 1, 1988 (JP) ................................................ 63-047848

(51) Int. Cl.⁷ .................................................. H04N 5/235
(52) U.S. Cl. ............................................ 348/363; 348/364
(58) Field of Search ...................................... 348/362, 364, 348/366, 349, 352, 363; 354/410, 430; 250/208.1, 201.1, 229; 396/89, 96, 98, 147; H04N 5/238

(56) References Cited

U.S. PATENT DOCUMENTS

| | | | | |
|---|---|---|---|---|
| 4,409,472 | * | 10/1983 | Kimura | 348/363 |
| 4,427,996 | * | 1/1984 | Tamura | 348/229 |
| 4,535,364 | * | 8/1985 | Hirobe | 348/364 |
| 4,714,966 | * | 12/1987 | Saito et al. | 348/363 |
| 4,825,293 | * | 4/1989 | Kobayashi et al. | 348/229 |
| 4,872,058 | * | 10/1989 | Baha et al. | 348/345 |
| 4,884,144 | * | 11/1989 | Jinnai et al. | 348/229 |
| 5,036,400 | * | 7/1991 | Haruki | 348/364 |
| 5,065,248 | * | 11/1991 | Homma | 348/364 |

FOREIGN PATENT DOCUMENTS

| | | | | |
|---|---|---|---|---|
| 61-230476 | * | 10/1986 | (JP) | H04N/5/238 |
| 62-219778 | * | 9/1987 | (JP) | H04N/5/238 |

* cited by examiner

Primary Examiner—Tuan Ho
(74) Attorney, Agent, or Firm—Robin, Blecker & Daley

(57) ABSTRACT

An exposure control device includes a first exposure control circuit which is arranged to keep constant an average signal level of an image signal corresponding to the whole of an image sensing plane, and a second exposure control circuit which is arranged to compensate the average signal level according to the level of an image signal corresponding to a light measuring area set in a part of the image sensing plane. The second exposure control circuit has a response characteristic arranged to have its exposure control action performed at a slower response speed than the first exposure circuit.

23 Claims, 5 Drawing Sheets

VIDEO CAMERA APPARATUS HAVING AN EXPOSURE CONTROL DEVICE

This is a continuation application under 37 CAR 1.62 of prior application Ser. No. 08/229,868, filed on Apr. 18, 1994 (aband.) is a continuation of Ser. No. 08/097,942, filed on Jul. 26, 1993 (aband.), which is a continuation of Serial No. 07/788,196, filed on Nov. 5, 1991 (aband.), which is a continuation of Ser. No. 07/651,282, filed on Feb. 5, 1991 (U.S. Pat. No. 5,065,248), which is a continuation of Ser. No. 07/513,683, filed on Apr. 24, 1990 (aband.), which is a continuation of Ser. No. 07/312,962, filed on Feb. 21, 1989 (aband.).

BACKGROUND OF THE INVENTION

1. Field of the Invention

This invention relates to an automatic exposure control device adapted for a video camera or the like.

2. Description of the Related Art

Heretofore, a video camera or the like has been using an automatic exposure control device which controls the iris of an optical system and an automatic gain control (hereinafter referred to as AGC) circuit to keep the level of a video signal constant.

FIGS. 1, 2 and 3 of the accompanying drawings show the arrangement of the automatic exposure control device of the conventional video camera. FIG. 1 is a block diagram mainly showing in outline the typical arrangement of the exposure control system of the video camera. The illustration includes a photo-taking lens 1; an iris 2 which is arranged to adjust the quantity of incident light coming through the photo-taking lens 1; a CCD 3 serving as an image sensor which is arranged to photo-electric convert into a video signal the image of an object formed through the lens 1 on the image sensing plane thereof and to output the video signal; a buffer amplifier 4 which is disposed on the output side of the CCD 3; an AGC circuit 5 which performs gain control to keep constant the level of the video signal supplied from the buffer amplifier 4; and a video signal processing circuit 6 which is arranged to perform a processing operation on the level-adjusted video signal supplied from the AGC circuit 5, including gamma correction, a blanking process, addition of a synchronizing signal, etc. Further, a light measuring circuit 7a is arranged to make the incident light quantity at an apposite value by detecting the level of the signal output from the buffer amplifier 4 and by controlling the iris 2 via an iris driving circuit 8 according to the detected level. In other words, the light measuring circuit 7a is arranged to control the iris 2 in such a way as to keep the output signal level of the buffer amplifier 4 constant. Another light measuring circuit 7b is arranged to perform gain control to keep the output signal level of the AGC circuit 5 constant by detecting the output signal level of the AGC circuit 5 and by feeding back an error signal according to the result of the level detection. Generally, averaging circuits are employed as these light measuring circuits 7a and 7b. The details of each of the averaging circuits are as shown by way of example in FIG. 2. The internal circuit arrangements of the two light measuring circuits 7a and 7b are the same. Therefore, only the light measuring circuit 7a is described below:

Referring to FIG. 2, the light measuring circuit 7a includes a buffer amplifier 71a, a resistor R1 and a capacitor C1. The resistor R1 and the capacitor C1 constitute a time constant circuit 72a. The video output signal 4' which has been output from the buffer amplifier 4 is averaged at a time constant τ by the time constant circuit 72a. The averaged signal is supplied to the iris driving circuit 8 through the buffer amplifier 71a. The iris driving circuit 8 then controls the iris 2 in accordance with the averaged signal. Meanwhile, the other light measuring circuit 7b is likewise supplied with a video output signal 5' output from the AGC circuit 5, which is averaged by the light measuring circuit 7b at the time constant τ. The averaged signal is supplied to the AGC circuit 5.

In the event of a high contrast image, however, the light measurement performed by the above-stated light measuring circuit results in an entirely blackened picture under a back light condition or in an entirely whitened picture under a forward light condition. In both cases, the light measurement gives a very unnatural picture.

To solve this problem, a so-called in-frame light measuring method has been proposed. In accordance with this method, a light measuring area is set at a part of the image sensing plane and the light measurement is carried out with the light measuring area weighted, so that an exposure can be adjusted to a main object to be photographed. FIG. 3 shows by way of example the arrangement of such a light measuring circuit. The light measuring circuit of FIG. 3 differs from that of FIG. 2 in that an analog switch 91 is arranged before a time constant circuit within the light measuring circuit 9 to provide a gate for setting a part of the image sensing plane as a light measuring area. The light measuring circuit 9 includes a buffer amplifier 92, a resistor R1 and a capacitor C1 which constitute a time constant circuit in the same manner as in the case of FIG. 2. In each of the video signals 4' and 5', a signal part corresponding to the light measuring area is gated by means of this analog switch 91. The video signal obtained during the passing period of this gate is averaged by the time constant circuit 93. A control signal 94 which is generated in synchronism with an H and V composite signal consisting of horizontal and vertical synchronizing signals is arranged to control the ON/OFF switching action of this analog switch 91. The analog switch 91 is thus arranged to be turned on for a video signal part corresponding to the light measuring area of the image sensing plane to have this signal part alone allowed to pass there.

In a case where the video camera has a light measuring circuit arranged in accordance with the so-called in-frame light measuring method as shown in FIG. 3, a time constant of the time constant circuit is generally arranged to be several tens of msecs which corresponds to several frames of a TV signal. This arrangement enables the signal level of an image plane to be kept almost constant to give a natural picture in terms of visual sensation even in the event of a sudden change in light quantity resulting from a quick panning or tilting movement of the camera. However, in cases where a photographing operation is to be performed with the camera fixed to keep a picture frame stationary, the signal level within a light measuring area would change to result in a sudden level change of the video signal if, for example, the object being photographed happens to laterally move relative to the light measuring area. In such a case, the image becomes very unnatural. This phenomenon saliently appears particularly in the event of a great contrast between the object to be photographed and the background thereof. Further, an unnatural picture likewise appears also in a case where the camera is slowly moved by a panning or tilting action to have the light measuring area moved across an object of a high relative contrast. This problem may be miti-gated by setting the above-stated time constant at such a value that allows the video signal to slowly change in terms of visual sensation as mentioned in the foregoing. However, that arrangement degrades the follow-up capability of the video signal level in the event of a quick panning or tilting movement of the video camera.

U.S. patent application Ser. No. 264,204 filed Oct. 28, 1988 and assigned to the assignee of the present invention has disclosed an exposure control device of the above-stated kind. The exposure control device is arranged to change the position of the light measuring area following the movement of the image of an object to be photographed and also to change the size of the light measuring area according to the size of the object's image. This arrangement enables the device to adequately accomplish exposure control in accordance with the state of the object.

However, the above-stated patent application has disclosed nothing concerning the speed of response to a change occurring in the exposure conditions as a result of a change in the object.

SUMMARY OF THE INVENTION

This invention is directed to the solution of the above-stated problems of the prior art. It is, therefore, a first object of the invention to provide an exposure control device which is capable of performing exposure control with a response characteristic most apposite to changes in the image of an object to be photographed.

It is a second object of the invention to provide an exposure control device which is capable of performing exposure control without giving any unnatural impression to the visual sensation for any changes occurred in the image of an object to be photographed.

It is a third object of the invention to provide an exposure control device which never performs unnatural exposure control due to any faulty action caused by a disturbance inflicted upon an image sensing plane.

It is a fourth object of the invention to provide an exposure control device for a camera which causes no abrupt change in the level of signals even in the event of an object highly contrasting with the background thereof and is capable of performing natural exposure control by allowing the level of a video signal to adequately follow any quick panning or tilting movement of the camera.

An exposure control device arranged according to this invention to perform exposure control on the basis of an image signal output from image sensing means comprises: first exposure control means for keeping constant a signal level of an image signal corresponding to a first detection area set on an image sensing plane; and second exposure control means for compensating the first exposure control means according to an average level of an image signal corresponding to a second detection area set on the image sensing plane and different from the first detection area, wherein control response characteristics of the first and second exposure control means are arranged to differ from each other.

Further, another exposure control device which is arranged according to the invention to perform exposure control on the basis of an image signal output from image sensing means comprises: first exposure compensation means for compensating an average signal level of the image signal by detecting a change in an average signal level of an image signal corresponding to a first detection area set on an image sensing plane to output a first compensation signal; second exposure compensation means for compensating an average signal level of the image signal by detecting a change in an average signal level of an image signal corresponding to a second detection area set on the image sensing plane to output a second compensation signal with a response characteristic different from that of the first exposure compensation means; and exposure control means for controlling an exposure on the basis of the first and second compensation signals to keep constant an average signal level of the image signal output from the image sensing means.

It is another object of the invention to provide an exposure control device for a video camera which is capable of performing natural exposure control without bringing about any abrupt change in the level of a video signal even in cases where an object's image on an image sensing plane is suddenly changed by a quick panning or tilting movement of the camera or where a high luminance object comes to move across a light measuring area.

Under this object, a video camera which is arranged according to the invention as a preferred embodiment thereof to perform exposure control on the basis of an image signal output from image sensing means comprises: light quantity control means for adjusting the quantity of light incident on the image sensing means; an automatic gain control (AGC) means arranged in a signal route for the image signal; first exposure compensation means for outputting a first compensation signal by detecting a change in an average signal level of an image signal corresponding to a first detection area set on an image sensing plane; second exposure compensation means for outputting a second compensation signal by detecting a change in an average signal level of an image signal corresponding to a second detection area set on the image sensing plane; and exposure control means for supplying the first compensation signal and the second compensation signal at the respective different time constants to the light quantity control means and/or the AGC means to control an average signal level of the image signal output from the image sensing means.

These and further objects and features of the invention will become apparent from the following detailed description of embodiments thereof taken in connection with the accompanying drawings.

DETAILED DESCRIPTION OF THE PREFERRED EMBODIMENTS

Figure 1:
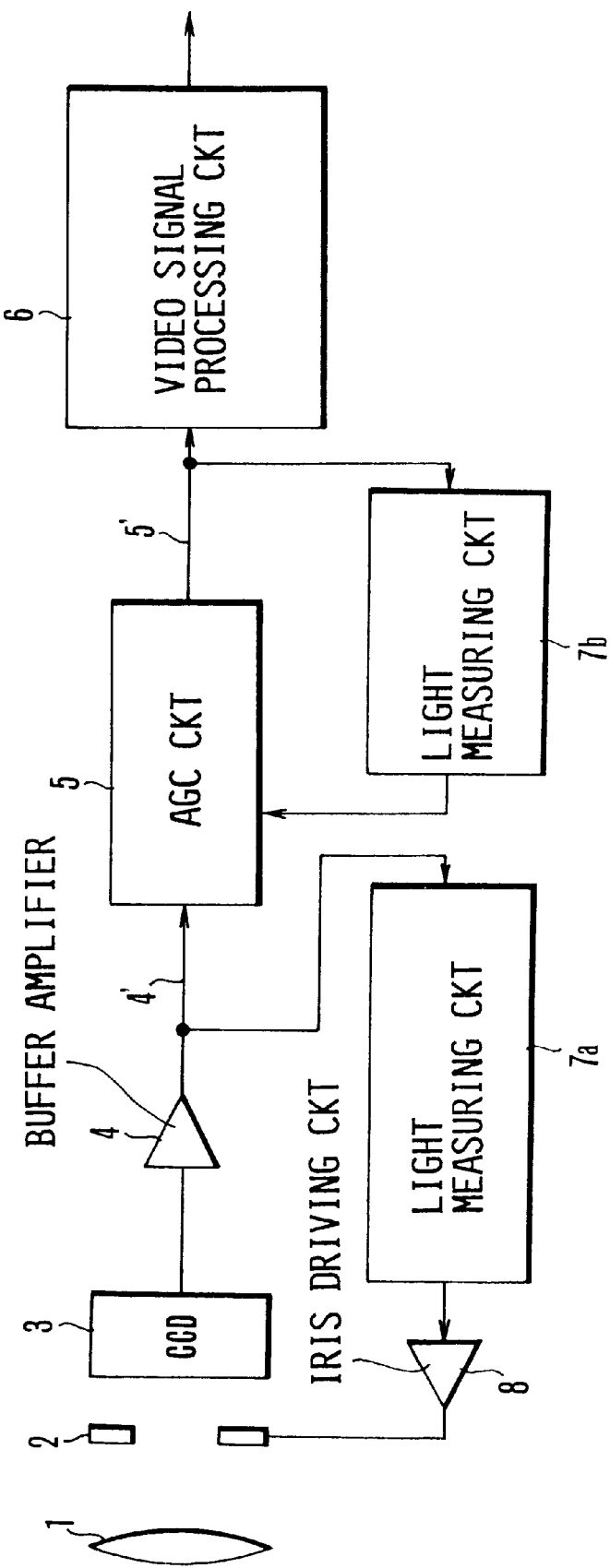
FIG. 1 is a block diagram showing an example of the conventional exposure control device.
Figure 4:
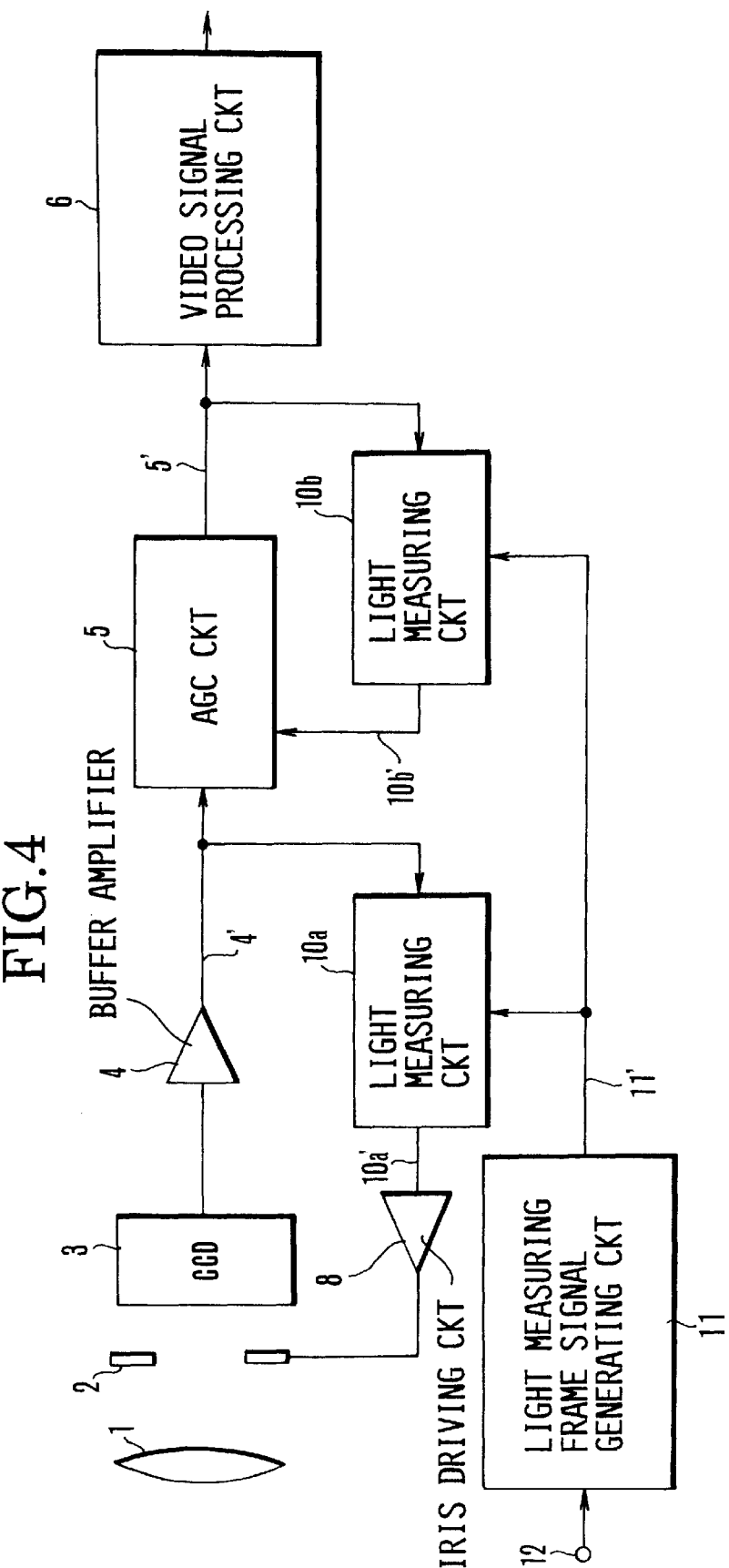
FIG. 4 is a block diagram showing the arrangement of an exposure control device arranged according to this invention as an embodiment thereof wherein the invention is applied to a video camera.

Exposure control devices embodying this invention are arranged as described below with reference to FIGS. 4 to 7 of the accompanying drawings:

FIG. 4 shows an exposure control device arranged as an embodiment of this invention. The illustration includes a photo-taking lens 1, an iris 2, a CCD 3, a buffer amplifier 4, an AGC circuit 5, a video signal processing circuit 6 and an iris driving circuit 8, which are arranged in the same manner as the conventional device shown in FIG. 1. Therefore, they are indicated by the same reference numerals and the details of them are omitted from the following description.

Figure 7:
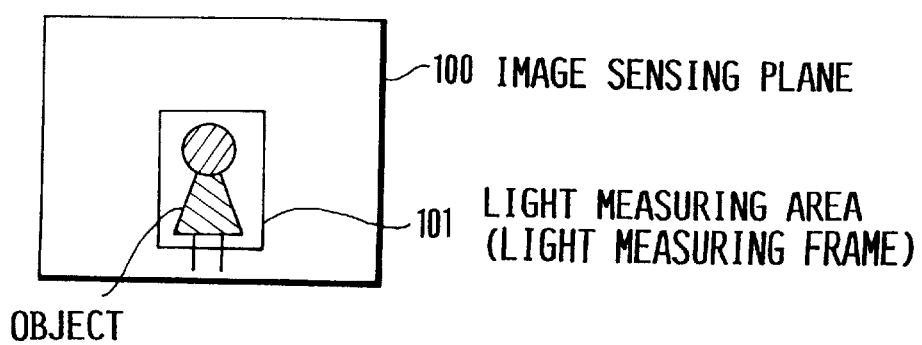
FIG. 7 is an illustration of an image sensing plane.

Referring to FIG. 4, a light measuring circuit 10a is arranged to detect a signal level of a video signal 4' output via the buffer amplifier 4 from the CCD 3, and to supply the result of detection to the iris driving circuit 8. The iris 2 is controlled by the iris driving circuit 8 in such a way as to keep the level of the video signal 4' constant. A light measuring circuit 10b is arranged to detect a signal level of a video signal 5' output from the AGC circuit 5 and to feed back the result of detection to the AGC circuit 5 in such a way as to keep the level of the video signal 5' constant. A light measuring frame signal generating circuit 11 is arranged to set a light measuring area, i.e., a light measuring frame 101 of a predetermined size at a part of an image sensing plane 100 in synchronism with a synchronizing signal, as shown in FIG. 7. Then, the light measuring frame signal generating circuit 11 generates a gate signal 11' for taking out only a video signal portion that corresponds to an area inside the light measuring frame 101. The position and the size of the light measuring frame 101 on the image sensing plane 100 can be set as desired by means of the gate signal 11' generated by the light measuring frame signal generating circuit 11. The light measuring frame 101 may be arranged either to be fixed or to be movable in a manner as disclosed, for example, in U.S. patent application Ser. No. 264,204 filed on Oct. 28, 1988. The gate signal 11' is arranged to be generated on the basis of an H and V composite synchronizing signal which is input by a composite synchronizing signal input terminal 12.

Figure 5:
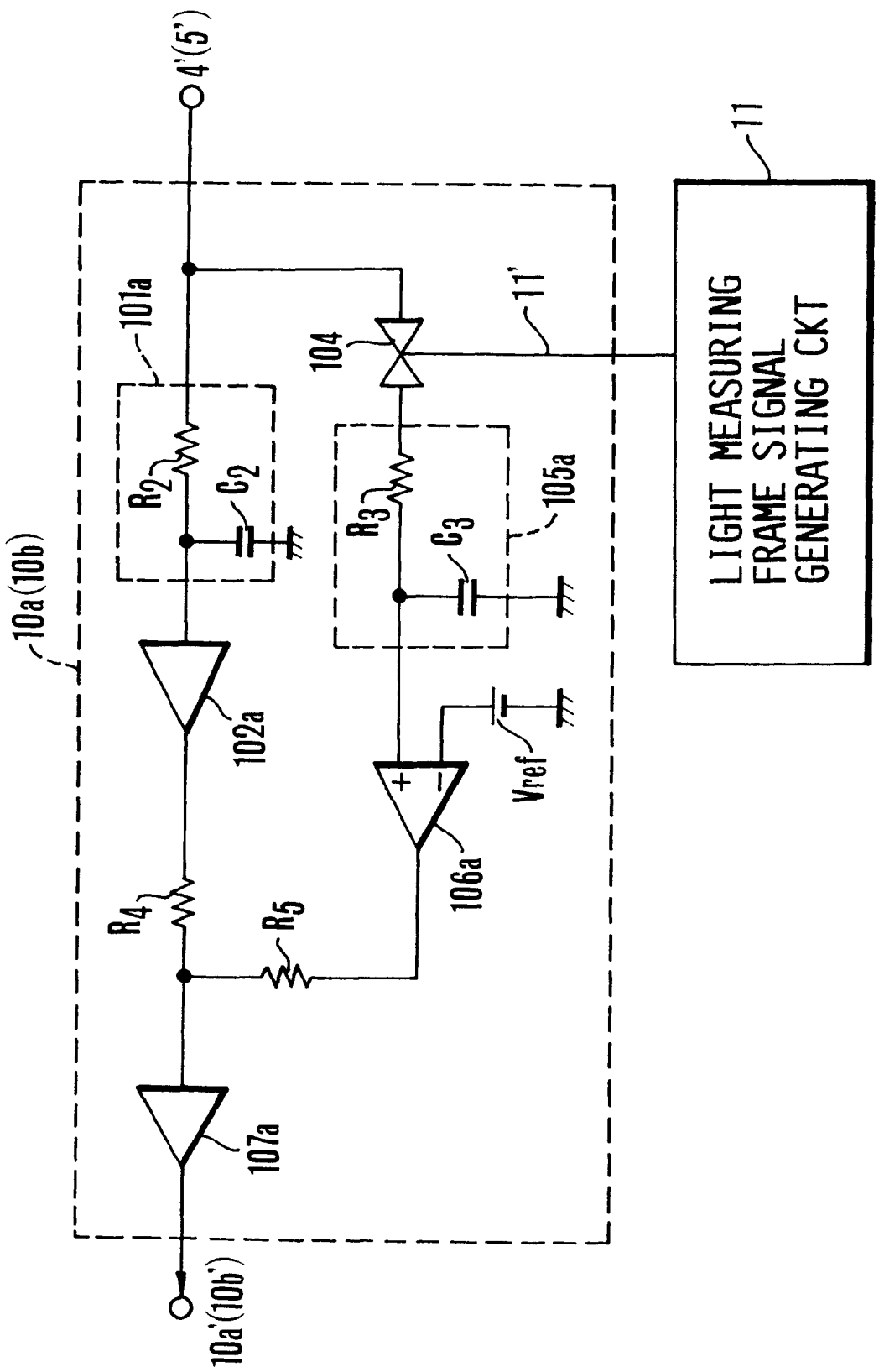
FIG. 5 is a circuit diagram showing the internal arrangement of a light measuring circuit which is included in FIG. 4.

FIG. 5 is a circuit diagram showing the internal arrangement of the light measuring circuit 10a or 10b. Since the internal circuit arrangements of these circuits 10a and 10b are identical with each other, the following description covers only the circuit 10a.

Referring to FIG. 5, the video signal 4' which has been supplied from the CCD 3 via the buffer amplifier 4 is averaged for the whole image sensing plane at a time constant Ti by a time constant circuit 101a which is composed of a resistor R2 and a capacitor C2. The averaged video signal is taken out via a buffer amplifier 102a, a resistor R4 and another buffer amplifier 107a and is then supplied to the iris driving circuit 8. Meanwhile, the video signal 4' is also supplied to an analog switch 104 which is arranged to open and close under the control of a gate signal 11' output from the light measuring frame signal generating circuit 11. The analog switch 104 thus takes out only a video signal portion corresponding to an area inside the light measuring frame 101 set on the image sensing plane 100. The video signal thus obtained via the analog switch 104 is supplied to a time constant circuit 105a which is composed of a resistor R3 and a capacitor C3. The time constant circuit 105a then averages the video signal at another time constant $\tau 2$. The average value of the video signal portion corresponding to the light measuring frame 101 is supplied to an amplifier 106a to be amplified to a predetermined level according to a difference thereof from a voltage Vref which is supplied to the amplifier 106a as an input bias. The amplified average value is supplied to the buffer amplifier 107a and, then, acts as a compensation signal for the output of the buffer amplifier 102a. The input bias voltage Vref is set at a value equal to the output of the light measuring circuit 10a or 10b to be obtained under a stationary condition. In other words, the voltage Vref is set at a value equal to a value desired for controlling the iris 2 or the AGC circuit 5.

Figure 2:
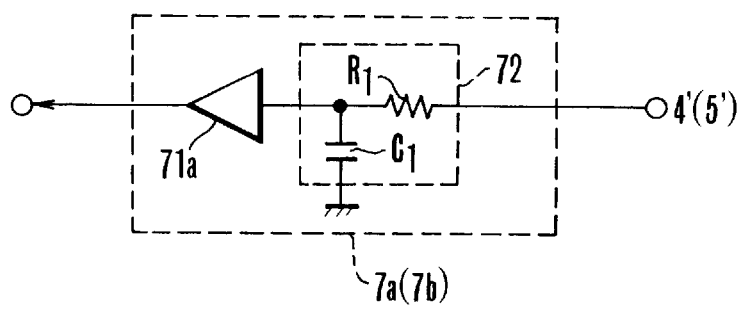
FIG. 2 is a circuit diagram showing the internal arrangement of the conventional light measuring circuit.
Figure 3:
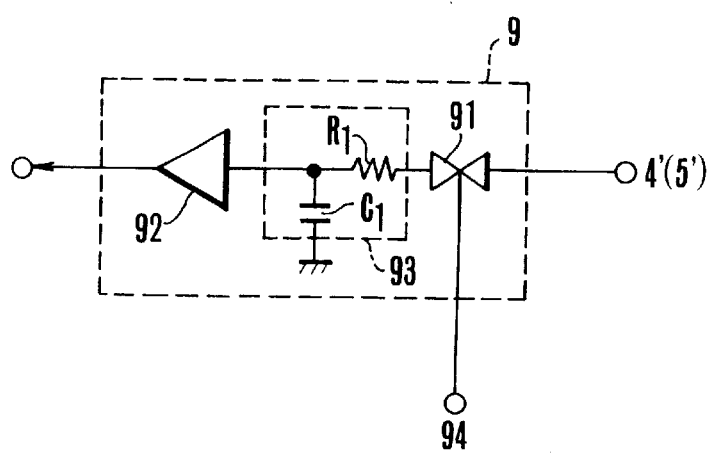
FIG. 3 is a circuit diagram showing another example of the conventional light measuring circuit.

In a case where the average value of the video signal obtained from within the light measuring frame 101 is less than the average value of the video signal obtained from the whole image sensing plane 100, thus indicating that the object located within the light measuring frame 101 is in a back light state relative to the background thereof, the input voltage level of the amplifier 106a becomes lower than the voltage Vref and the output level of the amplifier 106a becomes lower than that of the buffer amplifier 102a. This causes a current to flow from the buffer amplifier 102a to the resistors R4 and R5 and the amplifier 106a. As a result, a control voltage output from the light measuring circuit 10a via the buffer amplifier 107a drops. By this arrangement, the output level of the iris driving circuit 8 or that of the AGC circuit 5 is controlled to be kept constant. Therefore, an exposure is compensated by raising the level of the video signal to such an extent that makes up for the voltage drop. The output voltage 10a' or 10b' of the light measuring circuit 10a or 10b is thus eventually maintained at a constant value. In other words, a back-light compensation is carried out in accordance with information obtained from within the light measuring frame 101. Further, if the average value obtained from within the light measuring frame 101 is greater than the average value of the whole image sensing plane 100, thus indicating a forward light condition, the input voltage level of the amplifier 106a is higher than the voltage Vref. This causes the output level of the amplifier 106a to be higher than that of the buffer amplifier 102a. Then, a current flows from the amplifier 106a to the resistors R5 and R4 and the buffer amplifier 102a. As a result, the control voltage output from the light measuring circuit 10a via the buffer amplifier 107a rises. This causes the iris driving circuit 8 or the AGC circuit 5 to act to have its output level controlled and kept constant. Therefore, the exposure is compensated in such a way as to have the level of the video signal lowered to such an extent that makes up for the rise of voltage. The voltage outputs 10a' and 10b' of the light measuring circuits 10a and 10b are thus eventually kept constant. In short, a forward-light compensation is carried out in accordance with information obtained from within the light measuring frame 101. In a case where the average value obtained from within the light measuring frame 101 is equal to the average value obtained from the whole image sensing plane 100, that is, in a case where the whole image sensing plane 100 is evenly exposed to light, both the forward-light compensation and the back-light compensation must be prevented from being performed. For this purpose, the light measuring circuit 10a or 10b is set into a state of "the average value of the whole image sensing plane=the average value within the light measuring frame=the input bias voltage Vref of the operational amplifier 106a". As a result, the output voltages 10a' and 10b' of the light measuring circuits 10a and 10b become equal to the average value within the whole image plane 100 to meet the above-stated requirement. Further, in the case of FIG. 5, the time constant $\tau 1$ of the time constant circuit 101a which is composed of a resistor R2 and a capacitor C2 is set at a value which is the same as the time constant $\tau$ (several tens of msecs) of the conventional average light measuring arrangement shown in FIG. 2. The time constant $\tau 2$ of the time constant circuit 105a which is composed of a resistor R3 and a capacitor C3 is set at a value (several seconds) for allowing a signal level change to occur at a sufficiently slow speed in terms of visual sensation.

With the embodiment arranged in this manner, the average level within the whole image sensing plane is processed with the same response characteristic as in the case of an ordinary exposure control while the back-light or forward-light compensation is performed in accordance with the average signal level within the light measuring frame which is set in a part of the image sensing plane. Further, in cases where a high contrast object moves or where an object of a high relative contrast is caused to move across the image sensing plane by a panning or tilting movement of the camera, the response speed of the signal level within the light measuring frame is retarded, so that the image sensing plane can be prevented from being inappropriately compensated in response to a change in the video signal level.

Figure 6:
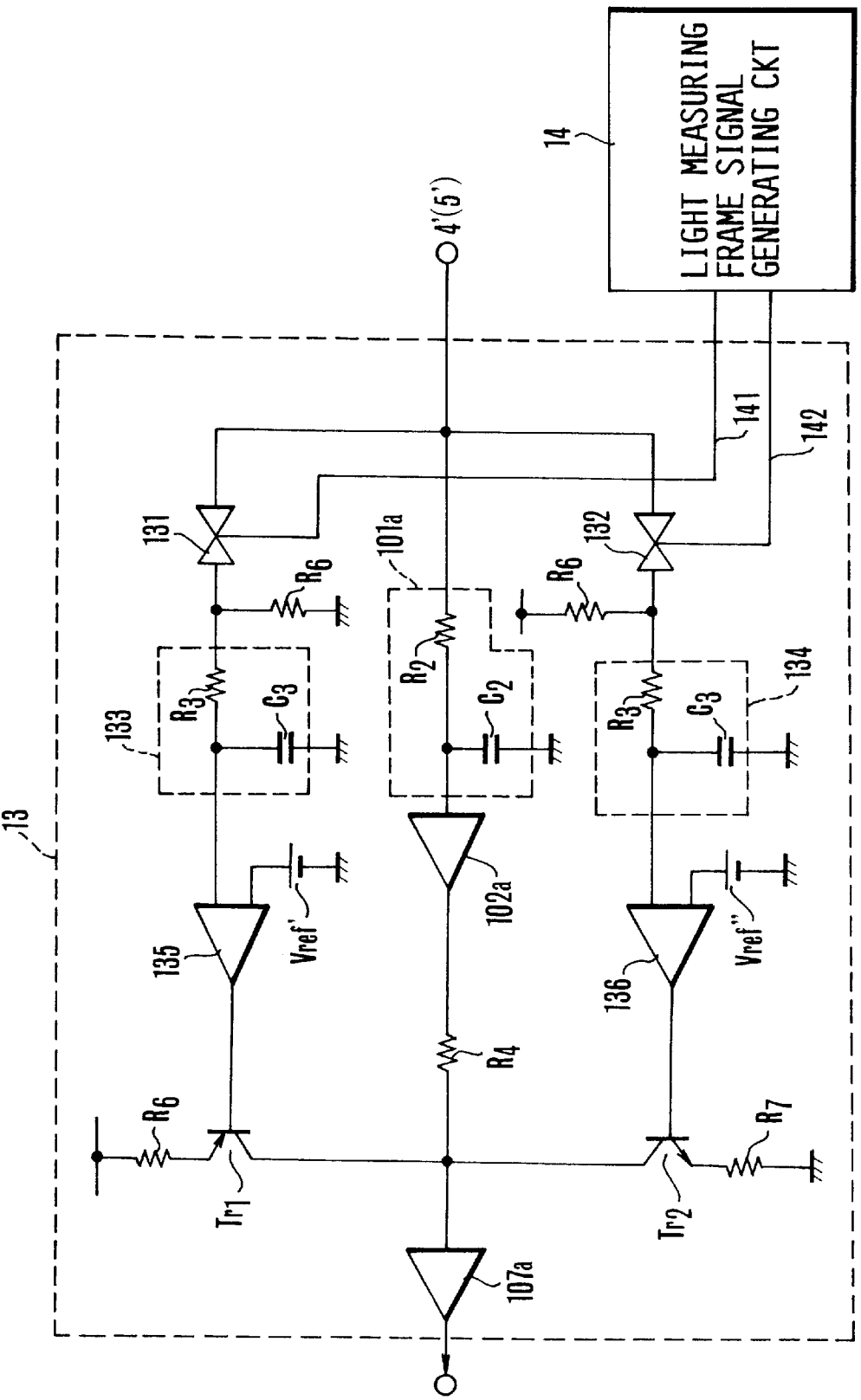
FIG. 6 is a circuit diagram showing a light measuring circuit arranged as another embodiment of the invention.

FIG. 6 shows a light measuring circuit which is arranged also according to the invention as another embodiment thereof. In FIG. 6, the same component parts as those shown in FIGS. 4 and 5 are indicated by the same reference numerals. Referring to FIG. 6, a reference numeral 13 denotes a light measuring circuit. A video signal 4' or 5' which has been output from the buffer amplifier 4 or from the AGC circuit 5 is supplied to a time constant circuit 101a which is composed of a resistor R2 and a capacitor C2. Upon receipt of the video signal, the time constant circuit 101a takes out the average value of the signal for the whole image sensing plane. The average value thus taken out is fed back via the buffer amplifiers 102a and 107a either to the iris driving circuit 8 or the AGC circuit 5. A video signal portion corresponding to the area inside the light measuring frame 101 is obtained as follows. The video signal is also supplied to analog switches 131 and 132 which are arranged respectively to open and close under the control of gate signals 141 and 142 output as a light measuring frame signal from the light measuring frame signal generating circuit 14. The video signal is divided into two channels by these analog switches 131 and 132. The two channel signals are then respectively taken out in an averaged state by time constant circuits 133 and 134 each of which is composed of a resistor R3 and a capacitor C3. The signals output from these time constant circuits 133 and 134 are respectively supplied to inverting amplifiers 135 and 136. The amplifiers 135 and 136 compare these signals with input bias voltages Vref' and Vref" and produce signals according to differences obtained as the result of such comparison. The signals output from the amplifiers 135 and 136 are supplied to the bases of transistors Tr1 and Tr2 to control these transistors Tr1 and Tr2. The inverting amplifiers 135 and 136 are arranged to perform exposure compensation according to the signal level obtained from within the light measuring frame 101. Further, bias resistors R6 and R7 are provided for setting the circuit into an adequate operating state.

In accordance with the circuit arrangement of this embodiment, the transistor Tr1 is arranged to act only in the direction of lowering the level of the video signal, i.e. in the direction of effecting forward-light compensation. The other transistor Tr2 is arranged to act only in the direction of raising the video signal level, i.e. in the direction of effecting back-light compensation. When the gate signal 141 is cut off, the transistor Tr1 is turned off to allow the circuit to perform only the back-light compensation. When the other gate signal 142 is cut off, the other transistor Tr2 is turned off to allow the circuit to perform only the forward-light compensation. Further, when both the gate signals 141 and 142 are cut off, both the transistors Tr1 and Tr2 are turned off to bring the embodiment into an average light measuring mode.

Further, in the case of the embodiment shown in FIG. 6 also, the time constant of the time constant circuit 101a which is composed of the resistor R2 and the capacitor C2 is set at a value of several tens of msecs while the time constant of each of the time constant circuits 133 and 134 is set at a value of several seconds.

As mentioned in the foregoing, the exposure control device according to this invention is arranged as follows: The time constant which is used for compensating the average signal level of the whole image sensing plane is set at a value greater than the time constant which is used for controlling the average signal level of the whole image sensing plane. With the device arranged in this manner, the control over the average signal level of the image sensing plane and the back-light compensation and the forward-light compensation which are to be accomplished in accordance with the average signal level obtained within the light measuring frame are carried out in the same manner as in the case of the conventional exposure control device. In addition to that, the invented arrangement has the following advantage. In cases where a high contrast object happens to move past or where an object of a high relative contrast is caused to move across the light measuring frame of the image sensing plane by a panning or tilting movement of the camera, the exposure control device is capable of preventing any compensation from being performed inappositely to the image sensing plane in response to any change that momentarily takes place on such occasions in the signal level obtained within the light measuring frame. This invention, therefore, gives a highly reliable exposure control device which is stable and seldom performs a faulty operation.

What is claimed is:

1. A video camera apparatus, comprising:
   (A) an image sensor for converting an image formed on an image sensing plane to an image signal;
   (B) an image processing circuit for performing a predetermined camera process on the image signal output from said image sensor and outputting a video signal based on a predetermined format;
   (C) an iris control circuit for controlling an iris by a feed-back loop for controlling an amount of incident light;
   (D) a gain control circuit for controlling a gain for amplifying the image signal by a feed-back loop serially connected to said iris control circuit;
   (E) a detecting circuit for extracting, between said image sensor and said image processing circuit, a predetermined signal from the image signal in each of a plurality of areas set in an image frame and detecting levels of the predetermined signals and distribution of the levels of the predetermined signals, said detecting circuit discriminating an exposure condition on the basis of the distribution; and
   (F) an exposure control circuit for selecting said areas and controlling said iris control circuit and said gain control circuit and correction responding speeds of said iris control circuit and said gain control circuit on the basis of the levels of the predetermined signals and the exposure condition.

2. An apparatus according to claim 1, wherein said exposure control circuit is arranged to output a correcting signal to correct a change of the predetermined signal, depending on a detection value of the predetermined signal level corresponding to each of said plurality of areas detected by said detecting circuit and to correct said change of the predetermined signal level on the basis of the correcting signal, and said exposure control circuit is so arranged that a correction responding speed to the detection value of a smaller area is slower than that of a larger area.

3. An apparatus according to claim 2, wherein said exposure control circuit is arranged to vary a time constant at the time of applying the correcting signal, in accordance with a size of each of said plurality of areas.

4. An apparatus according to claim 1, wherein said detecting circuit is arranged to detect a level of a luminance signal of the image in each of said plurality of areas and to detect a change of the luminance level as a change of said predetermined signal level.

5. An apparatus according to claim 3, wherein said exposure control circuit includes light amount limiting means for limiting an amount of incident light to said image sensing plane and the gain control circuit for varying a gain of said predetermined signal.

6. A video camera apparatus, comprising:
(A) an image sensor for converting an image formed on an image sensing plane to an image signal;
(B) an image processing circuit for performing a predetermined process on the image signal output from said image sensor and outputting an image signal based on a predetermined format;
(C) an iris control circuit for controlling an iris by a feed-back loop for controlling an amount of incident light;
(D) a gain control circuit for controlling a gain for amplifying the image signal by a feed-back loop serially connected to said iris control circuit and independently operable to the feed-back loop of said iris control circuit;
(E) a detecting circuit for extracting, between said image sensor and said image processing circuit, a predetermined signal from the image signal in each of a plurality of areas set in an image frame corresponding to said image sensing plane and detecting levels of the predetermined signals and a distribution of the levels of the predetermined signals; and
(F) an exposure control circuit for selecting said plurality of areas and controlling said iris control circuit and said gain control circuit and correction responding speeds of at least one of said iris control circuit and said gain control circuit on the basis of the levels of the predetermined signals and the distribution.

7. An apparatus according to claim 6, wherein said detecting circuit is arranged to detect a level of luminance signal of the image in each of said plurality of areas and to detect a change of the luminance level as a change of said predetermined signal level.

8. An apparatus according to claim 6, wherein said image sensor is arranged to set detection areas at a central portion and a portion around said central portion on said image sensing plane.

9. An apparatus according to claim 8, wherein said exposure control circuit is arranged to output a correction signal for correcting a change of the predetermined signal, depending on a detection value of the predetermined signal level corresponding to each of said plurality of areas detected by said detecting circuit and to correct the change of the predetermined signal level according to output of the correction signal, and said exposure control circuit is so arranged that a responding speed of a correcting operation based on the correction signal corresponding to the detection area set at said central portion is slower than that of the correcting operation based on the correction signal corresponding to the detection area set around said central portion.

10. An apparatus according to claim 9, wherein said exposure control circuit is arranged to vary a time constant at the time of applying the correction signal, in accordance with a size of each of said plurality of areas.

11. An apparatus according to claim 9, wherein said exposure control circuit includes light amount limiting means for limiting an amount of incident light to said image sensing plane and the gain control circuit for varying a gain of said predetermined signal.

12. A video camera apparatus, comprising:
(A) an image sensor for converting an image formed on an image sensing plane to an image signal;
(B) an image processing circuit for performing a predetermined process on the image signal output from said image sensor and outputting an image signal based on a predetermined format;
(C) an iris control circuit for controlling an iris by a feed-back loop for controlling an amount of incident light;
(D) a gain control circuit for controlling a gain for amplifying the image signal by a feed-back loop serially connected to said iris control circuit;
(E) a detecting circuit for extracting, between said image sensor and said image processing circuit, a predetermined signal from the image signal in each of a plurality of patterns set in an image frame and detecting levels of the predetermined signals and a pattern of the levels of the predetermined signals, said detecting circuit discriminating an exposure condition on the basis of the distribution; and
(F) an exposure control circuit for selecting said areas and controlling said iris control circuit and said gain control circuit and correction responding speeds of at least one of said iris control circuit and said gain control circuit on the basis of the levels of the predetermined signals and the distribution.

13. An apparatus according to claim 12, wherein said exposure control circuit is arranged to output a correcting signal to correct a change of the predetermined signal, depending on a detection value of the predetermined signal level corresponding to each of said plurality of patterns detected by said detecting circuit and to correct a change of the predetermined signal level on the basis of the output of the correcting signal, and said exposure control circuit is so arranged that a correction responding speed to the detection value of a smaller area is slower than that of a larger size.

14. An apparatus according to claim 13, wherein said smaller area is formed in a central portion of said image sensing plane and said larger area is equal to the whole image sensing plane.

15. An apparatus according to claim 12, wherein said exposure control circuit is arranged to vary a time constant at the time of an exposure controlling operation in accordance with the size of areas.

16. An apparatus according to claim 12, wherein said predetermined signal is a brightness level in said image signal.

17. An apparatus according to claim 12, wherein said exposure control circuit controls a diaphragm which restricts an amount of incident light on image pick-up means and a gain of said image signal.

18. An apparatus according to claim 12, wherein said exposure control circuit discriminates conditions of the image from a detection result of said detecting circuit and controls said plurality of patterns according to the discrimination so as to change over a light measuring pattern.

19. An exposure control method, comprising:
(A) a step of performing a predetermined process on an image signal output from an image sensor and outputting an image signal based on a predetermined format;

(B) a step of controlling an amount of incident light by controlling an iris with a first feed-back loop;

(C) a step of controlling a gain for amplifying the image signal by using a second feed-back loop;

(D) a step of extracting a predetermined signal from the image signal in each of a plurality of areas defined in an image frame, detecting levels of the predetermined signals and distribution of the levels of the predetermined signals and discriminating an exposure condition on the basis of the distribution; and (E) a step of controlling an exposure by selecting the areas and controlling the iris and the gain and correction responding speeds of the iris and the gain on the basis of the levels of the predetermined signals and the exposure condition.

20. A method according to claim 19, wherein said exposure controlling step outputs a correcting signal to correct a change of the predetermined signal depending on a detection value of the predetermined signal level corresponding to each of said plurality of areas and to correct the change of the predetermined signal level on the basis of the correcting signal, and in said exposure controlling step a correction responding speed to the detection value of a smaller area is slower than that of a larger area.

21. A method according to claim 20, wherein in said exposure controlling step a time constant at the time of applying the correcting signal is varied in accordance with a size of each of said plurality of areas.

22. A method according to claim 19, wherein in said extracting step a level of a luminance signal of the image in each of said plurality of areas is detected as a change of said predetermined signal level.

23. A method according to claim 21, wherein said exposure controlling step includes a light amount limiting step of limiting an amount of incident light to said image sensor and the gain controlling step of varying a gain of said predetermined signal.

* * * * *